(12) United States Patent
Ahn et al.

(10) Patent No.: US 11,970,592 B2
(45) Date of Patent: *Apr. 30, 2024

(54) WINDOW COVER FILM AND FLEXIBLE DISPLAY PANEL INCLUDING THE SAME

(71) Applicants: SK Innovation Co., Ltd., Seoul (KR); SK IE Technology Co., Ltd., Seoul (KR)

(72) Inventors: Jong Nam Ahn, Daejeon (KR); Keon Hyeok Ko, Daejeon (KR); Byoung Sun Ko, Daejeon (KR); Hye Jin Kim, Daejeon (KR); Je Seung Park, Daejeon (KR); Jin Su Park, Daejeon (KR); A Ran Hwang, Daejeon (KR)

(73) Assignees: SK Innovation Co., Ltd., Seoul (KR); SK ie technology Co., Ltd., Seoul (KR)

(*) Notice: Subject to any disclaimer, the term of this patent is extended or adjusted under 35 U.S.C. 154(b) by 425 days.

This patent is subject to a terminal disclaimer.

(21) Appl. No.: 17/034,384

(22) Filed: Sep. 28, 2020

(65) Prior Publication Data

US 2021/0095085 A1   Apr. 1, 2021

(30) Foreign Application Priority Data

Sep. 30, 2019   (KR) .................. 10-2019-0120761

(51) Int. Cl.
*C08J 7/04* (2020.01)
*C08J 7/046* (2020.01)
*C09D 5/16* (2006.01)

(52) U.S. Cl.
CPC ............... *C08J 7/042* (2013.01); *C08J 7/046* (2020.01); *C09D 5/1693* (2013.01)

(58) Field of Classification Search
CPC ................ C08J 2379/08; C08J 2433/06; C08J 2483/06; C08J 7/042; C08J 7/0427; C08J 7/046; C09D 5/1693
See application file for complete search history.

(56) References Cited

U.S. PATENT DOCUMENTS

| 6,103,368 A | 8/2000 | Fukuda et al. |
|---|---|---|
| 7,604,381 B2 | 10/2009 | Hebrink et al. |

(Continued)

FOREIGN PATENT DOCUMENTS

| CN | 109765729 A | 5/2019 |
|---|---|---|
| CN | 110066411 A | 7/2019 |

(Continued)

OTHER PUBLICATIONS

Kim et al., "Transparent Urethane Siloxane Hybrid Material for Flexible Cover Window with Ceramic-like Strength, yet Polymer-like Modulus", ACS Applied Materials & Interfaces, 2018, 30 pages.

(Continued)

*Primary Examiner* — Frances Tischler
(74) *Attorney, Agent, or Firm* — The Webb Law Firm (57) ABSTRACT

The present invention relates to a window cover film and a flexible display panel including the same. More particularly, the present invention relates to a window cover film including a base layer and a hard coating layer, and a flexible display panel including the same. Since the window cover film of the present invention has high surface hardness, flexibility, the excellent bending properties, the window cover film may be restored to the original form without permanent deformation and/or damage of the hard coating layer and the window cover film even though a predetermined deformation is repeated.

15 Claims, 3 Drawing Sheets

(56) References Cited

U.S. PATENT DOCUMENTS

| | | | |
|---|---|---|---|
| 9,061,474 | B2 | 6/2015 | Ju et al. |
| 9,132,611 | B2 | 9/2015 | Takeuchi |
| 9,580,555 | B2 | 2/2017 | Ju et al. |
| 9,676,960 | B2 | 6/2017 | Kim et al. |
| 9,706,649 | B2 | 6/2017 | Jung et al. |
| 9,791,597 | B2 | 10/2017 | Zheng |
| 9,914,811 | B2 | 3/2018 | Song et al. |
| 10,118,371 | B2 | 11/2018 | Kim et al. |
| 10,280,336 | B2 | 5/2019 | Shin et al. |
| 10,591,761 | B2 | 3/2020 | Jee et al. |
| 10,738,173 | B2 | 8/2020 | Chae et al. |
| 10,759,966 | B1 | 9/2020 | Kim et al. |
| 10,815,378 | B2 | 10/2020 | Kim et al. |
| 10,882,958 | B2 | 1/2021 | Ryu et al. |
| 11,518,921 | B2 | 12/2022 | Ahn et al. |
| 2010/0028682 | A1 | 2/2010 | Shinohara |
| 2011/0171445 | A1 | 7/2011 | Jung et al. |
| 2012/0021234 | A1 | 1/2012 | Fukukawa et al. |
| 2013/0011651 | A1 | 1/2013 | Iizumi et al. |
| 2013/0203937 | A1 | 8/2013 | Cho et al. |
| 2013/0207294 | A1 | 8/2013 | Jeon et al. |
| 2015/0344625 | A1 | 12/2015 | Kino et al. |
| 2016/0024348 | A1 | 1/2016 | Kim et al. |
| 2016/0046830 | A1 | 2/2016 | Kim et al. |
| 2016/0185926 | A1* | 6/2016 | Song ............... C08J 7/0427 428/447 |
| 2017/0106636 | A1 | 4/2017 | Jo et al. |
| 2017/0117523 | A1 | 4/2017 | Kim et al. |
| 2017/0276840 | A1 | 9/2017 | Horio et al. |
| 2017/0313901 | A1 | 11/2017 | Lee |
| 2017/0342224 | A1 | 11/2017 | Chae et al. |
| 2018/0113350 | A1 | 4/2018 | Jee et al. |
| 2018/0142127 | A1 | 5/2018 | Park et al. |
| 2018/0297330 | A1 | 10/2018 | Jeon et al. |
| 2019/0033494 | A1 | 1/2019 | Kim et al. |
| 2019/0077960 | A1 | 3/2019 | Kim et al. |
| 2019/0134963 | A1 | 5/2019 | Hara et al. |
| 2019/0153161 | A1 | 5/2019 | Ryu et al. |
| 2019/0256658 | A1 | 8/2019 | Odle et al. |
| 2019/0375894 | A1 | 12/2019 | Sakayori et al. |
| 2019/0390057 | A1 | 12/2019 | Miyamoto et al. |
| 2020/0010736 | A1 | 1/2020 | Lee et al. |
| 2020/0108587 | A1 | 4/2020 | Han et al. |
| 2020/0142102 | A1 | 5/2020 | Kikuchi |
| 2020/0339769 | A1 | 10/2020 | Lee et al. |
| 2021/0070017 | A1 | 3/2021 | Wilson et al. |
| 2021/0100120 | A1 | 4/2021 | Ahn et al. |

FOREIGN PATENT DOCUMENTS

| | | |
|---|---|---|
| JP | H8309940 A | 11/1996 |
| JP | 2004138655 A | 5/2004 |
| JP | 2011508039 A | 3/2011 |
| JP | 2012210780 A | 11/2012 |
| JP | 2014501301 A | 1/2014 |
| JP | 201632881 A | 3/2016 |
| JP | 201733031 A | 2/2017 |
| JP | 201733033 A | 2/2017 |
| JP | 2017503887 A | 2/2017 |
| JP | 2017520662 A | 7/2017 |
| JP | 201853156 A | 4/2018 |
| JP | 2018109773 A | 7/2018 |
| JP | 2018119133 A | 8/2018 |
| KR | 1019920002156 B1 | 3/1992 |
| KR | 100813179 B1 | 3/2008 |
| KR | 1020090064421 A | 6/2009 |
| KR | 1020100016372 A | 2/2010 |
| KR | 1020120067645 A | 6/2012 |
| KR | 1020120078510 A | 7/2012 |
| KR | 1020120079127 A | 7/2012 |
| KR | 101248671 B1 | 3/2013 |
| KR | 1020130025391 A | 3/2013 |
| KR | 1020130074167 A | 7/2013 |
| KR | 1020130078764 A | 7/2013 |
| KR | 101380033 B1 | 4/2014 |
| KR | 101401733 B1 | 5/2014 |
| KR | 1020150113916 A | 10/2015 |
| KR | 1020150138758 A | 12/2015 |
| KR | 1020160013402 A | 2/2016 |
| KR | 1020160020615 A | 2/2016 |
| KR | 1020160055655 A | 5/2016 |
| KR | 1020160057221 A | 5/2016 |
| KR | 1020160062353 A | 6/2016 |
| KR | 1020160103681 A | 9/2016 |
| KR | 1020160117396 A | 10/2016 |
| KR | 1020170016297 A | 2/2017 |
| KR | 1020170043885 A | 4/2017 |
| KR | 1020170132499 A | 12/2017 |
| KR | 1020170136285 A | 12/2017 |
| KR | 1020180018306 A | 2/2018 |
| KR | 1020180018307 A | 2/2018 |
| KR | 101839293 B1 | 3/2018 |
| KR | 1020180044216 A | 5/2018 |
| KR | 1020180058912 A | 6/2018 |
| KR | 1020180068252 A | 6/2018 |
| KR | 1020180071943 A | 6/2018 |
| KR | 1020180101463 A | 9/2018 |
| KR | 101922169 B1 | 11/2018 |
| KR | 1020190010119 A | 1/2019 |
| KR | 1020190018114 A | 2/2019 |
| KR | 1020190026611 A | 3/2019 |
| KR | 1020190029110 A | 3/2019 |
| KR | 1020190029790 A | 3/2019 |
| KR | 1020190037116 A | 4/2019 |
| KR | 1020190039180 A | 4/2019 |
| KR | 1020190063306 A | 6/2019 |
| KR | 1020190078225 A | 7/2019 |
| KR | 1020190080297 A | 7/2019 |
| KR | 1020190090300 A | 8/2019 |
| KR | 1020190094841 A | 8/2019 |
| KR | 1020190098679 A | 8/2019 |
| WO | 2016114389 A1 | 7/2016 |
| WO | 2017188174 A1 | 11/2017 |
| WO | 2018143554 A1 | 8/2018 |
| WO | 2018207914 A1 | 11/2018 |

OTHER PUBLICATIONS

Lee et al. "Measurement of Flexural Modulus of Lamination Layers on Flexible Substrates", Journal of the Microelectronic Packaging Society, 2016, pp. 63-67, vol. 23, No. 3 (English-Language Abstract).

Measurement method of physical properties—Measurement method of flexural property, R&F Chemical, retrieved Oct. 26, 2017, ram http://mfchemical.com/rnd/reference-2/?pageid=18&uid+769&mod=document.

Terephthaloyl chloride I8H4C1202 PubChem, https://pubchem.ncbi.nlm.nih.gov/compound/Terephtaloyl-chloride, retrieved Oct. 22, 2021.

\* cited by examiner

WINDOW COVER FILM AND FLEXIBLE DISPLAY PANEL INCLUDING THE SAME

CROSS-REFERENCE TO RELATED APPLICATION

This application claims priority to Korean Patent Application No. 10-2019-0120761 filed Sep. 30, 2019, the disclosure of which is hereby incorporated by reference in its entirety.

TECHNICAL FIELD

The following disclosure relates to a window cover film and a flexible display panel including the same.

BACKGROUND

A thin type display device such as a liquid crystal display device or an organic light emitting diode display device is implemented in a touch screen panel type, and has been widely used in various smart devices having portability such as a smart phone, a tablet PC, and various wearable devices.

Such a portable touch screen panel-based display device is provided with a display protective window cover on a display panel for protecting the display panel from scratches or external impact. Recently, in accordance with development of a foldable display device having flexibility, as a material of the window cover, glass has been replaced with plastic.

As a base material for the window cover film, polyethylene terephthalate (PET), polyethersulfone (PES), polyethylene naphthalate (PEN), polyacrylate (PAR), polycarbonate (PC), polyimide (PI), polyaramid (PA), polyamide-imide (PAI), or the like which is flexible and transparent has been used.

Recently, various studies on an optical plastic cover ensuring flexibility and impact resistance, and having strength or scratch resistance corresponding to those of tempered glass have been conducted. However, the polymer plastic substrate exhibits insufficient physical properties of hardness and scratch resistance as compared to the tempered glass used as a window cover for protecting a display, and also has insufficient impact resistance. Accordingly, many attempts to complement these insufficient physical properties of these plastic substrates by coating these plastic substrates with a composite resin composition have been in progress.

An out-folding manner in which a display is folded outward so that the display is exposed and an in-folding manner in which the display is folded inward so that the display is not exposed are applied to the foldable display device. In addition, a Z-fold type display device which may be folded and unfolded multiple times in an in-folding and out-folding manner has been developed, and a window cover film suitable for being applied to such a foldable display device has been developed. However, a flexible display device capable of both in-folding and out-folding at a specific position of the display device unlike the Z-fold type display device has been demanded.

RELATED ART DOCUMENT

Patent Document (Patent Document 1) Korean Patent Laid-Open Publication No. 10-2013-0074167 (Jul. 4, 2013)

SUMMARY

An embodiment of the present invention is to provide a window cover film applicable to a flexible display device capable of both in-folding and out-folding at a specific position.

Another embodiment of the present invention is to provide a window cover film having excellent optical properties while having improved durability and mechanical properties, and a flexible display panel including the same.

In one general aspect, a window cover film includes: a polyimide-based base layer; and a hard coating layer formed on at least one surface of the base layer, wherein a hybrid folding resistance capacity is 30,000 or more, the hybrid folding resistance capacity referring to the number n of times of repeated measurement on one surface in which a crack initially occurs when in-folding at a specific position of the window cover film against a cylinder having a radius of 5 mm at a rate of 60 cycles/min is repeatedly performed n times, and out-folding at the same position of the window cover film subjected to the in-folding, under the same conditions as those in the in-folding is repeatedly performed n times.

The hybrid folding resistance capacity may be 100,000 or more.

The hybrid folding resistance capacity may be 200,000 or more.

The base layer may have a modulus measured according to ASTM D882 of 3 GPa or more and a break elongation measured according to ASTM D882 of 8% or more.

The base layer may have a light transmittance measured at 388 nm according to ASTM D1746 of 5% or more, a total light transmittance measured at 400 to 700 nm according to ASTM D1746 of 87% or more, a haze of 2.0% or less, a yellow index of 5.0 or less, and a b* value of 2.0 or less.

The base layer may have a polyamide-imide structure.

The base layer may include a unit derived from fluorine-based aromatic diamine, a unit derived from aromatic dianhydride, and a unit derived from aromatic diacid dichloride.

The base layer may include a unit derived from alicyclic dianhydride. That is, the base layer may include a unit derived from a fluorine-based aromatic diamine, a unit derived from aromatic dianhydride, a unit derived from alicyclic dianhydride, and a unit derived from aromatic diacid dichloride.

A thickness of the base layer may be 10 to 500 μm, and a thickness of the hard coating layer may be 1 to 50 μm.

The hard coating layer may include an alicyclic epoxidized silsesquioxane-based compound.

A pencil hardness of the hard coating layer may be 2 H or higher.

The window cover film may further include an anti-fingerprint layer formed on the hard coating layer.

In another general aspect, there is provided a flexible display panel including the window cover film.

Other features and aspects will be apparent from the following detailed description, the drawings, and the claims.

DETAILED DESCRIPTION OF MAIN ELEMENTS

10: Base layer
20: Hard coating layer
30: Anti-fingerprint layer
100: Window cover film according to first exemplary embodiment
200: Window cover film according to second exemplary embodiment

DETAILED DESCRIPTION OF EMBODIMENTS

Unless otherwise defined, the terms used in the present invention have the same meanings as commonly understood by those skilled in the art. In addition, the terms used in the description of the present invention are only to effectively describe a specific exemplary embodiment, and are not to limit the present invention.

Unless the context clearly indicates otherwise, singular forms used in the specification and the appended claims of the present invention may be intended to include plural forms.

Throughout the specification describing the present invention, unless explicitly described to the contrary, "comprising" any components will be understood to imply further inclusion of other components rather than the exclusion of any other components.

The term "plurality of drying regions" in the present invention may refer to two or more drying regions, and may be expressed as a first drying region, a second drying region, and the like from the first drying region for convenience. More specifically, the number of the plurality of drying regions may be 2 to 10, and still more specifically, 3 to 7, but the present invention is not limited thereto. In addition, for example, when the number of the drying regions is 2, the term "drying region located at a rear stage" refers to a second drying region, and the term "drying region located immediately before" refers to a first drying region. When the number of the drying regions is 3 or more, the term "drying region located at a rear stage" may refer to a second drying region, a third drying region, or the like except for a first drying region. The term "last drying region" refers to a last section in a drying step.

The term "plurality of stretching regions" in the present invention may refer to two or more stretching regions, and may be expressed as a first stretching region, a second stretching region, and the like from the first stretching region for convenience. More specifically, the number of the plurality of stretching regions may be 2 to 10, and still more specifically, 3 to 7, but the present invention is not limited thereto. In addition, in the stretching region, uniaxial stretching is performed in a width direction or biaxial stretching is performed in a width direction and a machine direction.

The term "film" in the present invention may be a film obtained by applying a "resin solution" onto a base material, and drying and peeling the resin solution, and may be stretched or not stretched.

Figure 3:
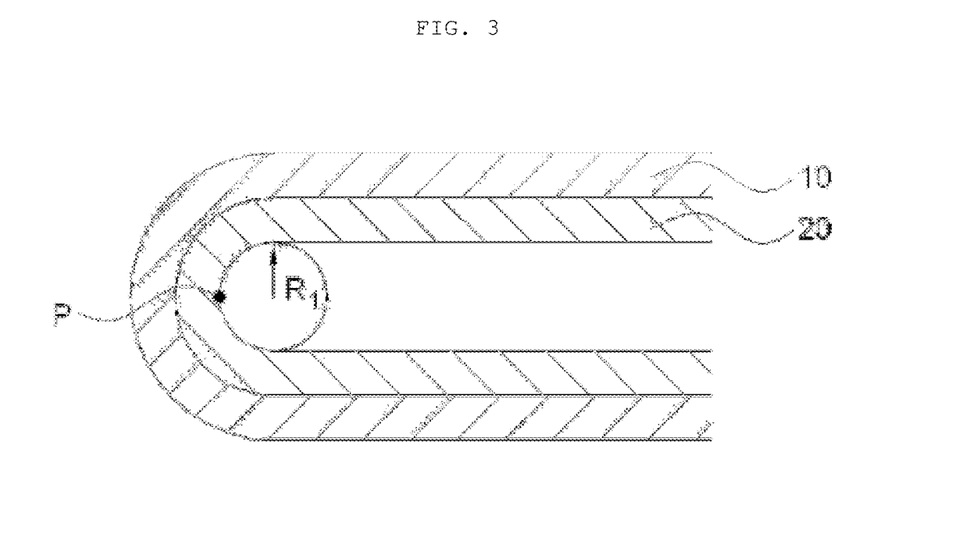
FIGS. 3 and 4 are views illustrating a method of measuring a hybrid folding resistance capacity of a window cover film according to an exemplary embodiment of the present invention.
Figure 4:
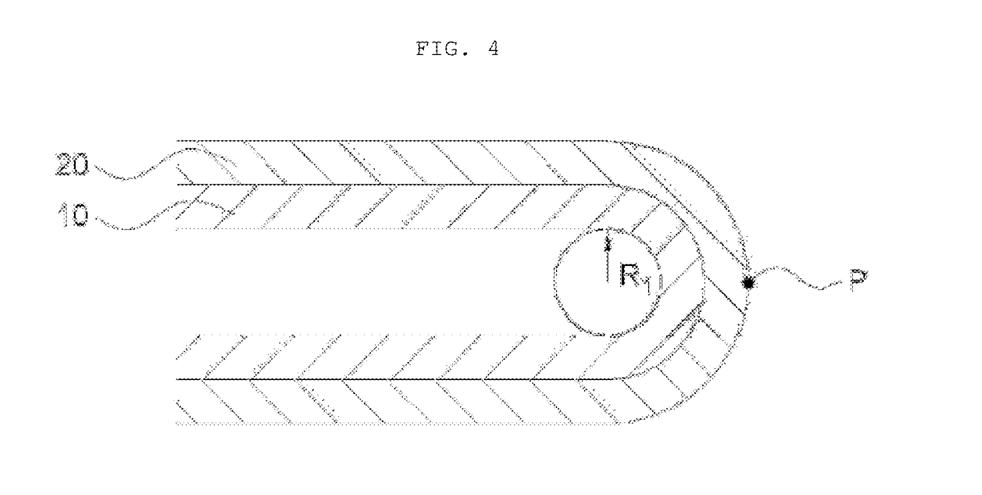
Figure 5:
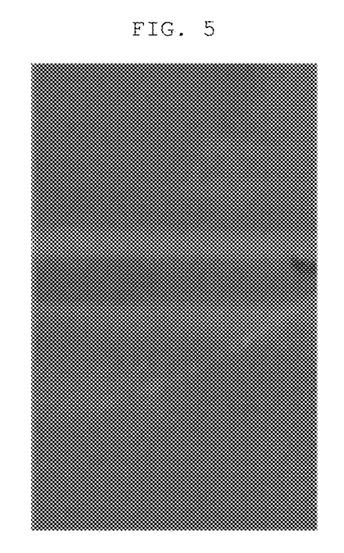
FIG. 5 is a photograph showing no occurrence of cracks when measuring the hybrid folding resistance capacity.
Figure 6:
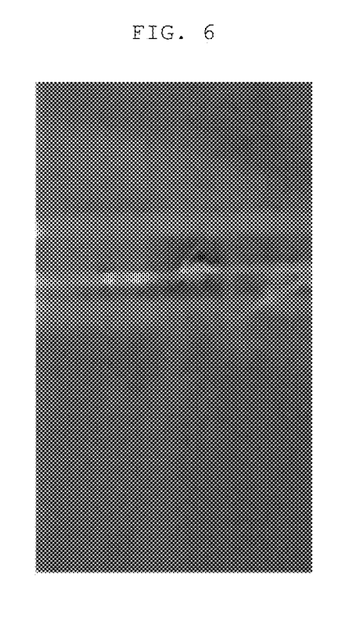
FIG. 6 is a photograph showing an occurrence of cracks when measuring the hybrid folding resistance capacity.

The term "hybrid folding resistance capacity" in the present invention may refer to permanent deformation and/or damage that does not occur at a deformed portion (for example, a folded portion) even though the window cover film is deformed by repeatedly in-folding and out-folding (for example, folding and unfolding) at the same position of the window cover film. FIGS. 3 and 4 illustrate that in-folding and out-folding are performed at the same position P. FIG. 5 is a photograph showing no occurrence of cracks. FIG. 6 is a photograph showing an occurrence of cracks. Specifically, the number of times of repeated measurement on one surface in which a crack initially occurs is 30,000 or more.

As a result of conducting intensive studies to solve the above problems, the inventors of the present invention found that a window cover film having a hybrid folding resistance capacity of 30,000 times or more, more preferably 50,000 times or more, more preferably 100,000 times or more, and still more preferably 200,000 times or more, the hybrid folding resistance capacity being measured by performing in-folding and out-folding at the same position P, may be applicable to a window cover film of a flexible display panel, and more preferably, to a window cover film for a flexible display device capable of both in-folding and out-folding at a specific position, as well as a window cover film of a Z-fold type display device which is multiply folded in an in-folding and out-folding manner, thereby completing the present invention.

In addition, the present inventors of the present invention found that when a polyimide-based film formed of a polyamide-imide resin prepared by a specific composition and preparation method is used and a specific hard coating layer is formed on the polyimide-based film, the hybrid folding resistance capacity is greatly improved even though in-folding and out-folding are performed tens of thousands times at the same position, thereby completing the present invention.

Hereinafter, the respective configurations of the present invention will be described in more detail with reference to the drawings. However, this is only illustrative, and the present invention is not limited to specific exemplary embodiments which are illustratively described by the present invention.

Figure 1:
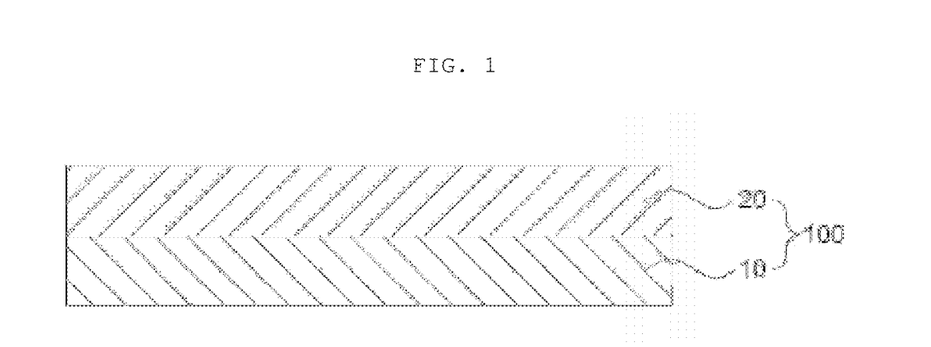
FIG. 1 is a schematic view illustrating a cross section of a window cover film according to an exemplary embodiment of the present invention.

FIG. 1 is a schematic view illustrating a window cover film according to an exemplary embodiment of the present invention. As illustrated in FIG. 1, a window cover film 100 according to an exemplary embodiment of the present invention includes a base layer 10 and a hard coating layer 20 formed on one surface of the base layer 10.

Figure 2:
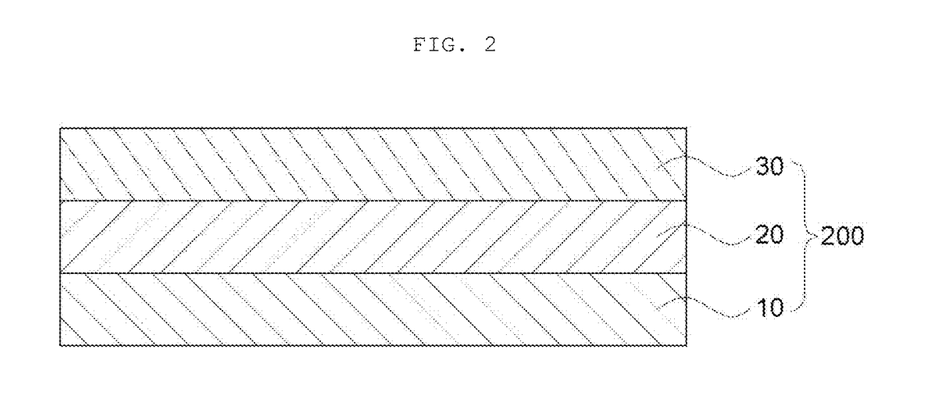
FIG. 2 is a schematic view illustrating a cross section of a window cover film according to an exemplary embodiment of the present invention.

FIG. 2 is a schematic view illustrating a window cover film according to an exemplary embodiment of the present invention. As illustrated in FIG. 2, a window cover film according to an exemplary embodiment of the present invention may include a base layer 10, a hard coating layer 20 formed on one surface of the base layer 10, and an anti-fingerprint layer 30 formed on the hard coating layer 20.

In addition, in an exemplary embodiment of the present invention, the respective layers may be stacked in direct contact with each other, or with another layer therebetween.

Specifically, the hybrid folding resistance capacity may refer to that deformation does not occur even though a window cover film is repeatedly deformed at the same position, specifically, an operation in which in-folding (illustrated in FIG. 3) and out-folding (illustrated in FIG. 4) are performed is repeated at the same position, and as an example, the hybrid folding resistance capacity may refer to that a crack does not occur. Specifically, when measuring the hybrid folding resistance capacity, the number of times of repeated measurement on one surface in which a crack initially occurs may be 30,000 or more, preferably, 100,000 or more, more preferably, 150,000 or more, more preferably, 180,000 or more, and still more preferably, 200,000 or more. The term "crack" may refer to a "fine crack". The term "fine crack" used in the specification may refer to a crack having a size that is not normally observed with the naked eye. The fine crack may refer to, for example, a crack having a width of 0.5 µm or more and a length of 10 µm or more, and may be observed with a microscope.

FIGS. 3 and 4 are views illustrating a method of measuring a hybrid folding resistance capacity of a window cover film according to an exemplary embodiment of the present invention. An operation in which one surface of the window cover film, for example, a surface on which the hard coating layer 20 is formed is wound around a cylinder having a radius of 5 mm and folded is repeatedly performed at a rate of 60 cycles/min, as illustrated in FIG. 3, and an operation in which an opposite surface is folded is repeatedly performed at the same rate of 60 cycles/min so that the same position P is folded, as illustrated in FIG. 4, thereby measuring the hybrid folding resistance capacity. In a case where the hard coating layer is formed on a surface or each of both surfaces of the base layer 10, the opposite surface refers to the other surface (not illustrated) of the hard coating layer, and the hybrid folding resistance capacity is measured by repeatedly folding the opposite surface at a rate of 60 cycles/min.

In general, the flexible display device is repeatedly deformed (folded) when used. In a case where the fine cracks occur when the flexible display device is deformed, as the deformation is repeated, the number of fine cracks is increased. Accordingly, the fine cracks may be gathered, and thus, cracks that are visible to the naked eye may be formed. In addition, as the number of cracks is increased, flexibility of the flexible display device is reduced, and a break may thus occur when additional folding is performed. Moisture or the like permeates into the cracks, which causes deterioration of durability of the flexible display device.

In the window cover film according to the exemplary embodiments of the present invention, the fine cracks may be substantially prevented, and durability and lifetime characteristics of the display device may thus be secured.

Hereinafter, the base layer, the hard coating layer, and the anti-fingerprint layer constituting the window cover film according to an exemplary embodiment will be described in more detail with reference to FIGS. 1 and 2.

<Base Layer>

The base layer has excellent optical properties and mechanical properties, and may be formed of a material having an elastic force and a restoring force.

In an exemplary embodiment of the present invention, a thickness of the base layer may be 10 to 500 µm, 20 to 250 µm, or 30 to 100 µm.

In an exemplary embodiment of the present invention, the base layer may have a modulus measured according to ASTM D882 of GPa or more, 4 GPa or more, or 5 GPa or more, a break elongation measured according to ASTM D882 of 8% or more, 12% or more, or 15% or more, a light transmittance measured at 388 nm according to ASTM D1746 of 5% or more or 5 to 80%, a total light transmittance measured at 400 to 700 nm according to ASTM D1746 of 87% or more, 88% or more, or 89% or more, a haze measured according to ASTM D1003 of 2.0% or less, 1.5% or less, or 1.0% or less, a yellow index measured according to ASTM E313 of 5.0 or less, 3.0 or less, or 0.4 to 3.0, and a value measured according to ASTM E313 of 2.0 or less, 1.3 or less, or 0.4 to 1.3.

In an exemplary embodiment of the present invention, the base layer is formed of a polyimide-based resin, and may be formed of, for example, a polyimide-based resin having a polyamide-imide structure.

In addition, the base layer is more preferably formed of a polyamide-imide-based resin having a fluorine atom and an aliphatic cyclic structure. In particular, in a case where the base layer is formed of a polyamide-imide-based resin obtained by polymerizing an amine-terminated polyamide oligomer obtained by polymerizing fluorine-based aromatic diamine and aromatic diacid dichloride and monomers including alicyclic dianhydride and aromatic dianhydride, mechanical properties, optical properties, and a hybrid folding resistance capacity are excellent, which is more preferable.

In an exemplary embodiment of the present invention, as an example of the polyamide-imide-based resin having the fluorine atom and the aliphatic cyclic structure, in a case where an amine-terminated polyamide oligomer derived from first fluorine-based aromatic diamine and aromatic diacid dichloride is produced, and a polyamide-imide polymer is produced by polymerizing the amine-terminated polyamide oligomer and monomers derived from second fluorine-based aromatic diamine, aromatic dianhydride, and alicyclic dianhydride, the object of the present invention is better achieved, which is preferable. The first fluorine-based aromatic diamine and the second fluorine-based aromatic diamine may be of the same or different types.

In an exemplary embodiment of the present invention, in a case where an amine-terminated oligomer in which an amide structure is formed in a polymer chain by aromatic diacid dichloride, diamine, and alicyclic dianhydride are included in a monomer, the optical properties, and in particular, mechanical strength such as a modulus may be improved, and the hybrid folding resistance capacity may be further improved.

In an exemplary embodiment of the present invention, when the resin has a polyamide oligomer block as described above, a molar ratio of the diamine component including the amine-terminated polyamide oligomer and the second fluorine-based aromatic diamine to the dianhydride monomer including the aromatic dianhydride and the alicyclic dianhydride of the present invention is preferably 1:0.8 to 1.2, more preferably 1:0.9 to 1, and still more preferably 1:1. In addition, a content of the amine-terminated polyamide oligomer with respect to the entire diamine component is not particularly limited, but is more preferably 30 mol % or more, preferably 50 mol % or more, and still more preferably 70 mol % or more, in terms of satisfying the mechanical properties, yellow index, and optical properties of the present invention and further improving the hybrid folding resistance capacity. In addition, a composition ratio of the aromatic dianhydride to the alicyclic dianhydride is not particularly limited, and is preferably 30 to 80 mol %:70 to 20 mol %, in consideration of achieving the transparency, the yellow index, and the mechanical properties of the present invention, but the present invention is not limited thereto.

In addition, as another example, the polyamide-imide-based resin including the fluorine atom and the aliphatic cyclic structure may be a polyamide-imide-based resin obtained by mixing, polymerizing, and imidizing fluorine-based aromatic diamine, aromatic dianhydride, alicyclic dianhydride, and aromatic diacid dichloride. Such a resin has a random copolymer structure. A content of the aromatic diacid dichloride may be 40 moles or more, preferably 50 to 80 moles, with respect to 100 moles of diamine. A content of the aromatic dianhydride may be to 50 moles with respect to 100 moles of the diamine. A content of the alicyclic dianhydride may be 10 to 60 moles with respect to 100 moles of the diamine. The polyamide-imide-based resin may be prepared by polymerizing diacid dichloride and dianhydride with respect to the diamine monomer at a molar ratio of 1:0.9 to 1.1, and more preferably 1:1. A random polyamide-imide of the present invention is different in the optical properties such as transparency, the mechanical properties, and the like from the block polyamide-imide resin, but may also fall within the scope of the present invention.

In an exemplary embodiment of the present invention, a mixture of 2,2'-bis(trifluoromethyl)-benzidine and another known aromatic diamine may be used as the fluorine-based aromatic diamine, but 2,2'-bis(trifluoromethyl)-benzidine may be used alone. By using such a fluorine-based aromatic diamine, the optical properties and the yellow index of the polyamide-imide-based film may be improved. In addition, a tensile modulus of the polyamide-imide-based film may be improved, such that mechanical strength of the hard coating film may be improved and the hybrid folding resistance capacity may be further improved.

The aromatic dianhydride may be one or a mixture of two or more of 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride (SO2DPA), (isopropylidenediphenoxy) bis (phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxyphenyl) dimethyl silane dianhydride (SiDA), and bis(dicarboxyphenoxy) diphenyl sulfide dianhydride (BDSDA), but the present invention is not limited thereto.

As an example, the alicyclic dianhydride may be one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof.

In the present exemplary embodiment, in the case where the amide structure is formed in the polymer chain by the aromatic diacid dichloride, the optical properties, and in particular, the mechanical strength such as a modulus, may be greatly improved, and the hybrid folding resistance capacity may be further improved.

The aromatic diacid dichloride may be a mixture of two or more selected from the group consisting of isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof, but the present invention is not limited thereto.

In the present invention, a weight average molecular weight of the polyimide resin is not particularly limited, but may be 200,000 g/mol or more, preferably 300,000 g/mol or more, and more preferably 200,000 to 500,000 g/mol. In addition, a glass transition temperature of the polyimide resin is not limited, but may be 300 to 400° C., and more specifically, 330 to 380° C. Within the above ranges, a film having a high modulus, excellent mechanical strength, excellent optical properties, and less curl may be provided, which is preferable, but the present invention is not particularly limited thereto.

Hereinafter, a method of producing the base layer will be described.

In an exemplary embodiment of the present invention, the base layer may be produced by applying a "polyimide-based resin solution" including a polyimide-based resin and a solvent onto a base material, and drying or drying and stretching the base material. That is, the base layer may be produced by a solution casting method.

As an example, the base layer may be produced by a method including a step of producing an oligomer by reacting fluorine-based aromatic diamine with aromatic diacid dichloride, a step of producing a polyamic acid solution by reacting the produced oligomer, fluorine-based aromatic diamine, aromatic dianhydride, and alicyclic dianhydride with each other, a step of preparing a polyamide-imide resin by imidizing the polyamic acid solution, and a step of forming a film by applying a polyamide-imide solution obtained by dissolving the polyamide-imide resin in an organic solvent.

Hereinafter, the respective steps will be described in more detail by using a case in which a block polyamide-imide film is produced, as an example.

The step of producing the oligomer may include a step of reacting fluorine-based aromatic diamine with aromatic diacid dichloride in a reactor and a step of purifying and drying the obtained oligomer. In this case, the fluorine-based aromatic diamine may be introduced at a molar ratio of 1.01 to 2 relative to the aromatic diacid dichloride to produce an amine-terminated polyamide oligomer monomer. A molecular weight of the oligomer monomer is not particularly limited, but, for example, when a weight average molecular weight thereof is within a range of 1,000 to 3,000 g/mol, the film may have more excellent physical properties.

In addition, an aromatic carbonyl halide monomer such as terephthaloyl chloride or isophthaloyl chloride rather than terephthalic acid ester or terephthalic acid itself is preferably used to introduce an amide structure, which seems to affect the physical properties of the film by a chloride element, although the reason is not clear.

Next, the step of producing the polyamic acid solution may be performed by a solution polymerization reaction in which the produced oligomer, fluorine-based aromatic diamine, aromatic dianhydride, and alicyclic dianhydride are reacted with each other in an organic solvent. For example, the organic solvent used for the polymerization reaction in this case may be one or two or more polar solvents selected from the group of consisting of dimethylacetamide (DMAc), N-methyl-2-pyrrolidone (NMP), dimethylformamide (DMF), dimethylsulfoxide (DMSO), ethyl cellosolve, methyl cellosolve, acetone, ethylacetate, and m-cresol.

Next, the step of preparing the polyamide-imide resin by imidizing the polyamic acid solution may be performed through chemical imidization. More preferably, the polyamic acid solution is chemically imidized using pyridine and acetic anhydride. Subsequently, the polyamic acid solution may be imidized using an imidization catalyst and a dehydrating agent at a low temperature of 150° C. or lower, preferably 100° C. or lower, and specifically, 50 to 150° C.

In the case where the polyamic acid solution is imidized by such a method, mechanical properties may be uniformly imparted to the entire film as compared to a case where the polyamic acid solution is imidized by heat at a high temperature.

One or two or more selected from pyridine, isoquinoline, and β-quinoline may be used as the imidization catalyst. In addition, one or two or more selected from acetic anhydride, phthalic anhydride, and maleic anhydride may be used as the dehydrating agent, but the present invention is not limited thereto.

In addition, the polyamide-imide resin may be prepared by mixing the polyamic acid solution with an additive such as a retardant, an adhesive enhancer, an inorganic particle, an antioxidant, an ultraviolet stabilizer, or a plasticizer.

In addition, after the imidization is performed, the resin may be purified using the solvent to obtain a solid content, and the solid content may be dissolved in a solvent, thereby obtaining a polyamide-imide solution. The solvent may include, for example, N,N-dimethylacetamide (DMAc) and the like, but the present invention is not limited thereto.

The step of forming the film of the polyamide-imide solution is performed by applying the polyamide-imide solution onto a base material and drying the polyamide-imide solution in a drying step divided into a drying region. In addition, a stretching step may be performed before or after the drying step, or a heat treatment step may be further performed after the drying or stretching step, if necessary. For example, glass, stainless steel, or a film may be used as the base material, but the present invention is not limited thereto. The application may be performed by a die coater, an air knife, a reverse roll, a spray, a blade, casting, gravure, spin coating, or the like.

In an exemplary embodiment of the present invention, more specifically, the step of forming the film of the poly-amide-imide solution may be performed by including a step of applying a polyamide-imide solution to a base material, a drying step divided into a plurality of drying regions, and a stretching step divided into a plurality of stretching regions. As such, in a case where a film is produced under a specific drying condition and stretching condition, a hard coating layer having significantly improved bending properties and no wave patterns, rainbow, and unevenness according to a viewing angle may be obtained, which is more preferable.

In the drying step in which a drying region is divided into a plurality of drying regions, a temperature of a drying region located at a rear stage is set to be higher than that of a drying region located immediately before the rear stage, and a temperature of each of drying regions located at a rear stage except for a first drying region is set to be the same as or higher than that of each of the drying regions located immediately before each of the drying regions at the rear stage except for the first drying region.

In the stretching step in which a stretching region is divided into a plurality of stretching regions, stretching is performed within a stretch width of 110% up to the last stretching region based on a film width of a first stretching region, a temperature of each of the stretching regions is set to be higher than that of the stretching region located before each of the stretching regions. The last stretching region or two stretching regions from the last stretching region may be shrunk to have a stretch width smaller than that of the stretching region located immediately before the stretching region.

More specifically, drying is performed in a plurality of drying regions with a specific temperature program, and preferably, in a plurality of drying regions having four drying regions. In the drying step in which the drying region is divided into the plurality of drying regions, a temperature of a drying region located at a rear stage is set to be higher than that of a drying region located immediately before the rear stage, and a temperature of each of drying regions located at the rear stage except for a first drying region is set to be the same as or higher than that of each of drying regions located immediately before each of the drying regions at the rear stage except for the first drying region.

In addition, the properties of the present invention may be achieved by imparting a specific temperature condition and stretching condition to the plurality of stretching regions. That is, in the stretching step in which the stretching region is divided into the plurality of stretching regions, stretching is performed within a stretch width of 110% up to the last stretching region based on a film width of a first stretching region, a temperature of each of the stretching regions is set to be higher than that of the stretching region located before each of the stretching regions. The last stretching region or two stretching regions from the last stretching region may be shrunk to have a stretch width smaller than that of the stretching region located immediately before the stretching region.

More specifically, the base layer according to an exemplary embodiment of the present invention, and still more specifically, the polyamide-imide-based film may be obtained by adopting a drying step in which a drying region at a rear stage is dried at a temperature higher than that of a drying region at a front stage thereof and a content of a solvent in the finally dried film in the drying region is adjusted to 15 to 30 wt % while adopting a plurality of drying regions having difference temperatures, when a film is produced by applying a casting solution in which a polyamide-imide-based resin is dissolved onto a base material or a conveyor belt using a solution casting method, drying and stretching the base material, and heat-treating the base material.

In addition, in a case of satisfying the content of the solvent of the finally dried film, when drying times in the regions in each step are the same as each other or have the same degree (a difference between a drying time in a rear stage and a drying time in a front stage being within 10% refers to the same degree), the mechanical properties may be improved, and coatability of the hard coating composition may be improved, which is preferable. However, in the drying step of the present invention, in the plurality of drying regions, when a retention time of a film to be dried in a rear drying region is longer than that in a drying region at a front stage thereof, as the film is moved to the drying region at a rear stage, the object of the present invention may be achieved, and thus, the retention time is not particularly limited. When the retention time is shortened, the mechanical strength for the purpose of the present invention is insufficient, which is not preferable.

The increase in the drying temperature in a drying region at a rear stage in the drying step does not mean that a temperature of the second drying region of an initial drying region is set to be higher than that of the first drying region, and a temperature of a drying region at a rear stage is lower than that of the second drying region. That is, when a drying region after the second drying region is defined as a rear stage, a temperature of the drying region at the rear stage may set to the same temperature as or the same degree of a temperature of each drying region.

As a specific example, when a drying step having four or more drying regions is adopted, the mechanical properties and the hybrid folding resistance capacity may be uniformly exhibited, which is more preferable. For example, in a case where a drying region is divided into four stages, drying in a first drying region may be performed at 70 to 100° for 1 to 5 minutes, drying in a second drying region may be performed at 90 to 130° for 1 to 5 minutes, drying in a third drying region may be performed at 120 to 160° for 1 to 5 minutes, and drying in a fourth drying region may be performed at 120 to 160° for 1 to 5 minutes. Drying may be performed by programming a temperature of a rear stage to be higher than that of a front stage. Alternatively, drying in each of the second to fourth drying regions except for the first drying region is performed at a temperature higher than that of the first drying region, and the temperatures in the second to fourth drying regions are the same as each other or gradually increased.

More specifically, the temperatures in the first drying region, the second drying region, the third drying region, and the fourth drying region may be set to 85° C., 115° C., 130° C., and 135° C., respectively. In addition, the temperatures in the first drying region, the second drying region, the third drying region, and the fourth drying region may be set to 85° C., 115° C., 130° C., and 130° C., respectively.

In addition, in an exemplary embodiment of the present invention, a process of drying the polyamide-imide-based film in the drying step, peeling off the polyamide-imide-based film including 15 to 30 wt % of a solvent from the base material or the conveyor belt, and stretching the polyamide-imide-based film in a tenter is adopted, such that a polyamide-imide-based film having an excellent hybrid folding resistance capacity of the present invention may be provided as long as a content of the solvent in the finally stretched film is maintained at 3 wt % or less, more preferably 2 wt % or less, and most preferably, 1 wt % or less.

That is, in the tenter stretching step according to an exemplary embodiment of the present invention, in a case where a stretching region is divided into a plurality of stretching regions, a stretch width of each of the stretching regions is set to be larger than that of each of stretching regions located before each of the stretching regions at a higher temperature than that of each of stretching regions at a front stage, and the stretching is performed in the last stretching region in the stretching step or the stretching region divided into four or more stages, when shrinkage is performed while maintaining the stretch width of the stretching region smaller than that of the stretching region at a rear stage in the last stretching region or the last two stretching regions located at a rear stage and the stretching step is terminated, a new polyamide-imide-based film having significantly improved mechanical properties and hybrid folding resistance capacity may be provided.

A stretch width or stretching ratio in the present invention refers to a size of a width relative to a film width in the first stretching region. For example, a stretch width or stretching ratio of 110% refers to a size of a width relative to a film width in the first stretching region. Specifically, stretching of a film having a width of 1 m in the first stretching region at a stretch width of 110% in the second stretching region means that the film is stretched to have a width of 1.1 m.

In addition, shrinkage refers to that a stretch width of the stretching region at a rear stage is set to be smaller than that of the stretching region at a front stage. For example, a case where stretching is performed at a stretch width of 110% in the second stretching region and then stretching is performed at a stretch width of 105% in the third stretching region means that shrinkage is performed in the third stretching region.

In a case where, more preferably, the stretching in the stretching region is performed at a stretch width of 110% or less, and still more preferably, 105% or less, relative to a film width to be introduced into the stretching region, and the condition in the stretching region is satisfied, the mechanical properties and hybrid folding resistance capacity for the purpose of the present invention may be exhibited. In addition, in an exemplary embodiment of the present invention, the conditions of the drying region and the stretching region are satisfied, such that the effects of the present invention may be further improved.

In addition, in an exemplary embodiment of the present invention, in the stretching step in which the stretching region is divided into the plurality of stretching regions, a temperature in the first stretching region into which the film is initially introduced in the drying step is set to a temperature raised by 0 to 50° C. with respect to a temperature in the last drying region in the drying step, which is preferable to achieve the object of the present invention. In a case where the temperature is out of the temperature range, the mechanical properties and coatability of the hard coating layer may be deteriorated.

<Hard Coating Layer>

Next, a hard coating layer will be described in detail.

In an exemplary embodiment of the present invention, the hard coating layer may be disposed on at least one surface of the base layer. For example, the hard coating layer may be disposed on one surface of the base layer, or may be disposed on each of both surfaces of the base layer. The hard coating layer may protect the base layer having the excellent optical properties and mechanical properties from external physical and chemical damage.

In an exemplary embodiment of the present invention, the hard coating layer may have a thickness of 1 to 50% of the entire thickness of the window cover film. Specifically, the hard coating layer may maintain optical properties while having excellent hardness. The thickness of the hard coating layer may be 1 to 50 μm, and more preferably, 1 to 30 μm. When the thickness of the hard coating layer is within the above ranges, the hard coating layer may maintain flexibility while having the excellent hardness, such that curl may not substantially occur.

In addition, a pencil hardness of the hard coating layer may be 2 H or higher, 3 H or higher, or 4 H or higher. When a scratch test is performed using steel wool (#0000, Liberon Limited), scratches are not generated at 10 times/1 Kgf, 20 times/1 Kgf, or 30 times/1 Kgf. A water contact angle of the hard coating layer may be 80° or more, 90° or more, or 100° or more.

In the present exemplary embodiment, the hard coating layer includes a silsesquioxane-based compound as a main component. More specifically, the silsesquioxane-based compound may be an alicyclic epoxidized silsesquioxane-based compound.

In this case, a weight average molecular weight of the silsesquioxane-based compound may be 1,000 to 20,000 g/mol. When the weight average molecular weight of the silsesquioxane-based compound is within the above range, the composition for forming a hard coating layer may have an appropriate viscosity. Therefore, flowability, coatability, and curing reactivity of the composition for forming a hard coating layer may be improved. In addition, the hardness of the hard coating layer may be improved. In addition, flexibility of the hard coating layer is improved, such that an occurrence of curl may be prevented. Preferably, the weight average molecular weight of the silsesquioxane-based compound may be 1,000 to 18,000 g/mol, and more preferably, 2,000 to 15,000 g/mol. The weight average molecular weight is measured using gel permeation chromatography (GPC).

The silsesquioxane-based compound includes, for example, a trialkoxysilane compound-derived repeating unit represented by the following Formula 1.

[Formula 1]

wherein A represents C1-C10 linear or branched alkyl group in which a C3-C7 alicyclic alkyl group is substituted with epoxy, and R is independently a C1-C3 alkyl group.

Here, the alkoxysilane compound may be one or more selected from 2-(3,4-epoxycyclohexyl)ethyltrimethoxysilane, 2-(3,4-epoxycyclohexyl)ethyltriethoxysilane, and 3-glycidoxypropyltrimethoxysilane, but the present invention is not limited thereto.

In addition, in an exemplary embodiment of the present invention, the silsesquioxane-based compound may include a trialkoxysilane compound-derived repeating unit represented by Formula 1 and a dialkoxysilane compound-derived repeating unit represented by the following Formula 2. In this case, the silsesquioxane-based compound may be prepared by mixing 0.1 to 100 parts by weight of the dialkoxysilane compound with respect to 100 parts by weight of the trialkoxysilane compound and performing condensation polymerization of the mixture. In this case, although the reason is not clear, surface hardness is increased and the bending properties are significantly improved, which is more preferable. It is considered that the bending properties are more efficiently exhibited by the alicyclic alkyl group substituted with epoxy in Formula 1, and the effect thereof is more increased as compared to a case where an alicyclic group is absent.

[Formula 2]

wherein $R_a$ is a linear or branched alkyl group selected from C1 to C5, and A and R are as defined in Formula 1.

Specific examples of the compound of Formula 2 may include 2-(3,4-epoxycyclohexyl)ethylmethyldimethoxysilane, 2-(3,4-epoxycyclohexyl)ethylpropyldimethoxysilane, 2-(3,4-epoxycyclohexyl)ethylmethyldiethoxysilane, and 2-(3,4-epoxycyclopentyl)ethylmethyldiethoxysilane, but the present invention is not limited thereto. These compounds may be used alone or as a mixture of two or more thereof.

In addition, in an exemplary embodiment of the present invention, the hard coating layer may include an inorganic filler. For example, metal oxide such as silica, alumina, or titanium oxide; hydroxide such as aluminum hydroxide, magnesium hydroxide, or potassium hydroxide; a metal particle such as gold, silver, copper, nickel, or alloys thereof; a conductive particle such as carbon, carbon nanotube, or fullerene; glass; or ceramic may be used as the inorganic filler. Preferably, silica may be used in terms of compatibility of the composition with another component. These inorganic fillers may be used alone or as a mixture of two or more thereof.

In addition, the hard coating layer may further include a slip agent. The slip agent may improve winding efficiency, blocking resistance, abrasion resistance, scratch resistance, or the like. For example, waxes such as polyethylene wax, paraffin wax, synthetic wax, and montan wax; and synthetic resins such as a silicone-based resin and a fluorine-based resin may be used as the slip agent. These slip agents may be used alone or as a mixture of two or more thereof.

Hereinafter, a method of forming the hard coating layer will be described in detail.

The hard coating layer is formed by preparing a composition for forming a hard coating layer, and applying and curing the composition onto a base layer.

In an exemplary embodiment of the present invention, the composition for forming a hard coating layer includes silsesquioxane, a cross-linking agent, and a photoinitiator.

In addition, the composition for forming a hard coating layer may further include an epoxy-based monomer, a photoinitiator and/or a thermal initiator, a solvent, a thermosetting agent, an inorganic filler, a slip agent, an antioxidant, a UV absorber, a light stabilizer, a thermal polymerization inhibitor, a leveling agent, a surfactant, a lubricant, or an antifoulant.

The cross-linking agent may form a cross-linking bond with an epoxy siloxane-based resin to solidify the composition for forming a hard coating layer, such that the hardness of the hard coating layer may be increased.

For example, the cross-linking agent may contain a compound represented by the following Formula 3. The cross-linking agent which is an alicyclic epoxy compound having the same epoxy unit as those in structures of Formula 1 and Formula promotes cross-linking bonding and allows the hard coating layer to maintain a refractive index, such that a viewing angle may not be changed, the bending properties may be maintained, and transparency of the hard coating layer may not be damaged, which is preferable.

[Formula 3]

wherein $R^1$ and $R^2$ each independently may represent hydrogen or a linear or branched alkyl group having 1 to 5 carbon atoms, and X may be a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

Here, the "direct bond" refers to a structure which is directly bonded without other functional groups. For example, in Formula 3, the direct bond may refer to two cyclohexanes directly connected to each other. In addition, the "connecting group" refers to two or more above-described substituents connected to each other. In addition, in Formula 3, substitution positions of $R_1$ and $R_2$ are not particularly limited, but when the carbon connected to X is set at position 1, and the carbons connected to an epoxy group are set at positions 3 and 4, it is preferable that $R_1$ and $R_2$ are substituted at position 6.

A content of the cross-linking agent is not particularly limited, and for example, may be 1 to 150 parts by weight with respect to 100 parts by weight of the epoxy siloxane resin. When the content of the cross-linking agent is within the above range, the viscosity of the composition may be maintained in an appropriate range, and coatability and curing reactivity may be improved.

In addition, in an exemplary embodiment of the present invention, various epoxy compounds may be added to the hard coating layer in addition to the above-described compounds of the formulas, as long as the characteristics of the present invention are achieved, but a content thereof is preferably less than 20 parts by weight with respect to 100 parts by weight of the compound of Formula 2.

In an exemplary embodiment of the present invention, the epoxy-based monomer may be included in an amount of 10 to 80 parts by weight with respect to 100 parts by weight of the composition for forming a hard coating layer. Within the above content range, the viscosity may be adjusted, the thickness may be easily adjusted, a surface may be uniform, a defect in a thin film does not occur, and the hardness is sufficiently achieved, but the present invention is not limited thereto.

In an exemplary embodiment of the present invention, the photoinitiator is a photo-cationic initiator. The photo-cationic initiator may initiate condensation of the epoxy-based monomer including the above-described compounds. As the photo-cationic initiator, for example, an onium salt and/or an organic metal salt may be used, but the present invention is not limited thereto. For example, a diaryliodonium salt, a triarylsulfonium salt, an aryldiazonium salt, an iron-arene complex, or the like may be used. These photo-cationic initiators may be used alone or as a mixture of two or more thereof.

A content of the photoinitiator is not particularly limited, and for example, may be 0.1 to 10 parts by weight, and more preferably 0.2 to 5 parts by weight with respect to 100 parts by weight of the compound of Formula 1.

In an exemplary embodiment of the present invention, non-limiting examples of the solvent may include alcohols such as methanol, ethanol, isopropanol, butanol, methyl cellosolve, and ethyl cellosolve; ketones such as methyl ethyl ketone, methyl butyl ketone, methyl isobutyl ketone, diethyl ketone, dipropyl ketone, and cyclohexanone; hexanes such as hexane, heptane, and octane; and benzenes such as benzene, toluene, and xylene. These solvents may be used alone or as a mixture of two or more thereof.

In an exemplary embodiment of the present invention, the solvent may be included in a residual amount excluding the amount of the remaining components in a total weight of the composition.

As an exemplary embodiment, the composition for forming a hard coating layer may further include a thermosetting agent. Examples of the thermosetting agent may include a sulfonium salt-based thermosetting agent, an amine-based thermosetting agent, an imidazole-based thermosetting agent, an acid anhydride-based thermosetting agent, and an amide-based thermosetting agent. It is preferable that a sulfonium salt-based thermosetting agent may be further used in terms of implementing discoloration prevention and high hardness. These thermosetting agents may be used alone or as a mixture of two or more thereof. A content of the thermosetting agent is not particularly limited, and may be, for example, 5 to 30 parts by weight with respect to 100 parts by weight of the epoxy siloxane resin. When the content of the thermosetting agent is within the above range, curing efficiency of the composition for forming a hard coating layer is further improved, such that a hard coating layer having excellent hardness may be formed.

In an exemplary embodiment of the present invention, by using the composition for forming a hard coating layer, the base layer may be physically protected, the mechanical properties of the base layer may be further improved, and the hybrid folding resistance capacity may be further improved. In addition, adhesion with an anti-fingerprint layer to be described below and coatability may be further improved, such that a window cover film having uniform physical properties over the entire area of the film may be provided. Specifically, it is possible to provide a window cover film in which cracks do not occur even though a bending operation is repeated 30,000 times or more, more specifically 30,000 to 200,000 times, and most preferably 200,000 times or more, when evaluating the hybrid folding resistance capacity.

In addition, various epoxy compounds may be added to the hard coating layer of the present invention in addition to the above-described compounds of the formulas, as long as the characteristics of the present invention are achieved, but a content thereof is preferably less than 20 parts by weight with respect to 100 parts by weight of the compound of Formula 1, in terms of achieving the object of the present invention.

A polymerization method of the alicyclic epoxidized silsesquioxane-based compound according to the present invention is not limited as long as it is a known method, but, for example, the alicyclic epoxidized silsesquioxane-based compound may be prepared by hydrolysis and a condensation reaction between alkoxy silanes in the presence of water. The hydrolysis may accelerate a reaction by including a component such as an inorganic acid. In addition, the epoxy silane-based resin may be formed by polymerization of a silane compound having an epoxycyclohexyl group.

In an exemplary embodiment of the present invention, the hard coating layer may be formed by applying the above-described composition for forming a hard coating layer onto an upper surface or a lower surface of the base layer and curing the composition. The curing may be performed by thermal curing and/or photo curing, and may be performed by using a method known in the art.

In an exemplary embodiment of the present invention, a plurality of base layers and hard coating layers may be stacked. For example, each of the plurality of base layers and the plurality of hard coating layers may be alternately stacked. In addition, each hard coating layer may be disposed on each of both surfaces of the base layer.

<Anti-Fingerprint Layer>

The window cover film of the present invention may further include an anti-fingerprint layer formed on an upper surface of the hard coating layer to improve an anti-fingerprint property.

In an exemplary embodiment of the present invention, the anti-fingerprint layer may be derived from a polyfunctional (meth)acrylate monomer having a (meth)acrylic group and a fluorinated (meth)acrylate monomer. The term of the (meth)acrylic group may include both a methacrylate group and an acrylate group.

The polyfunctional (meth)acrylate monomer may be a curable monomer, and specific examples thereof may include polyfunctional acrylates such as dipentaerythritol hexa(meth)acrylate, dipentaerythritol penta(meth)acrylate, pentaerythritol tetra(meth)acrylate, ditrimethylolpropane tetra(meth)acrylate, trimethylolpropane tri(meth)acrylate, glycerol tri(meth)acrylate, tris(2-hydroxyethyl)isocyanurate tri(meth)acrylate, ethylene glycol di(meth)acrylate, propyleneglycol (meth)acrylate, 1,3-butanedioldi(meth)acrylate, 1,4-butanediol di(meth)acrylate, 1,6-hexanediol di(meth)acrylate, neopentyl glycol di(meth)acrylate, diethylene glycol di(meth)acrylate, triethylene glycol di(meth)acrylate, dipropylene glycol di(meth)acrylate, bis(2-hydroxyethyl) isocyanurate di(meth)acrylate, and hydroxyethyl(meth) acrylate. M340 (Miwon Specialty Chemical Co., Ltd.) or the like may be used as a commercially available product.

Non-limiting examples of the fluorinated (meth)acrylate monomer may include Megaface RS-72K, RS-75, RS-76E, RS-76NS, RS-90, F-555, F-558, F-571, and F-552 (DIC Corporation), Optool DAC-HP and DSX (Daikin Industries, Ltd.), Fluorolink MD500, MD700, AD1700, 5101X, 5113X, and S10 (Solvay S.A.), and Fomblin MD40 (Solvay S.A.), and KY1203, KY164, and KY108 (Shin-Etsu Chemical Co., Ltd.). The compounds described above may be used alone or as a mixture of two or more thereof. More preferably, one or more selected from the group consisting of Megaface RS-75, RS-76E, RS-76NS, and RS-90 may be used.

Next, a method of forming the anti-fingerprint layer will be described.

The anti-fingerprint layer may be obtained by applying and curing an anti-fingerprint composition including a polyfunctional (meth)acrylate monomer having a (meth) acrylic group and a fluorinated (meth)acrylate monomer. More specifically, the anti-fingerprint composition may include a photoinitiator and a solvent.

The solvent is not limited as long as it dissolves resins used in the anti-fingerprint composition, but examples thereof may include benzene, toluene, methyl ethyl ketone, methyl isobutyl ketone, acetone, ethanol, tetrahydrofurfuryl alcohol, propyl alcohol, propylene carbonate, N-methyl pyrrolidinone, N-vinyl pyrrolidine, N-acetyl pyrrolidine, N-hydroxymethyl pyrrolidinone, N-butyl pyrrolidinone, N-ethyl pyrrolidinone, N—(N-octyl)pyrrolidinone, N—(N-dodecyl) pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl formamide, ethylene glycol, hexafluoroantimonate, monoalkyl ether of ethylene glycol, dialkyl ether of ethylene glycol, and derivatives (cellosolve) thereof. In addition, these solvents may be used alone or as a mixture of two or more thereof.

The photoinitiator is not limited as long as it is generally used in the polyfunctional (meth)acrylate resin, and specific examples thereof may include acetophenones, benzophenones, benzoins, propiophenones, benzyls, acylphosphic oxides, Michler's benzoyl benzoate, α-amyloxime ester, tetramethylfuran monosulfide, and thioxanthone. More specifically, benzophenone, 2-methyl-1-[4-(methylthio)phenyl] 2-morpholinepropan-1-one, diphenyl ketone benzyl dimethyl ketal, 2-hydroxy-2-methyl-1-phenyl-1-one, 4-hydroxycyclophenylketone, dimethoxy-2-phenylacetophenone, anthraquinone, fluorene, triphenylamine, carbazole, 3-methylacetophenone, 4-chloroacetophenone, 4,4-dimethoxyacetophenone, 4,4-diaminobenzophenone, and 1-hydroxycyclohexylphenylketone may be used as the photoinitiator, but the present invention is not limited thereto.

In addition, the anti-fingerprint composition may further include inorganic particles, if necessary. The anti-fingerprint composition includes the inorganic particles, such that the slip property and abrasion resistance may be further improved.

<Flexible Display Panel>

In an exemplary embodiment of the present invention, a flexible display panel or flexible display device that includes the window cover film according to an exemplary embodiment may be provided.

In this case, the window cover film may be used as the outermost window substrate of the flexible display device. The flexible display device may be various image display devices such as a general liquid crystal display device, an electro-luminescence display device, a plasma display device, and a field emission display device.

Hereinafter, the present invention will be described in more detail on the basis of examples and comparative examples. However, the following examples and comparative examples are only examples for describing the present invention in more detail, and the present invention is not limited by the examples and comparative examples.

Hereinafter, physical properties were measured as follows.

1) Pencil Hardness 20 mm of a line was drawn on a window cover film produced in each of the examples and the comparative examples according to JIS K5400 at a load of 750 g and a rate of 50 mm/sec, and the drawing of the line was repeated 5 times or more, to measure a pencil hardness on the basis of a generation of 1 or more scratches.

2) Hybrid Folding Resistance Capacity

A hard coating layer was cut out into a width of 100 mm and a length of 200 mm with a laser, the cut hard coating layer was fixed to a folding tester (YUASA Corporation) using an adhesive, a folding radius ($R_1$ of FIG. 3) was set to 5 mm, an in-folding test (inner side of a coating surface, referring to FIG. 3) was repeatedly performed at a rate of 60 cycles/min 30,000 times, 100,000 times, 150,000 times, 180,000 times, and 200,000 times, the same sample was subjected to an out-folding test (opposite side, referring to FIG. 4) performed at the same rate and the same number of times so that the same position P was folded, and then the cracks at the folded position were observed with the naked eye. The fine cracks were observed with a microscope. FIG. 5 is a photograph showing no occurrence of cracks, and FIG. 6 is a photograph showing an occurrence of cracks.

3) Weight Average Molecular Weight

<Weight Average Molecular Weight of Film>

A weight average molecular weight of the film was measured by dissolving the film in a DMAc eluent containing 0.05 M LiBr. Waters GPC system, Waters 1515 isocratic HPLC Pump, and Waters 2414 Refractive Index detector were used as GPC, an Olexis, a Polypore, and a mixed D column were connected to each other and used as a column, polymethyl methacrylate (PMMA STD) was used as a standard material, and the analysis was performed at 35° C. and a flow rate of 1 mL/min.

<Weight Average Molecular Weight of Silsesquioxane Resin>

In the measurement of a weight average molecular weight of a silsesquioxane resin, GPC (Waters GPC system, Waters 1515 isocratic HPLC Pump, Waters 2414 Refractive Index detector) was used, four Shodexs KF-801, 802.5, 803, and 805 (Waters Corporation) that were connected to each other in series were used as a GPC column, THF was used as a solvent, and a rate was 1 mL/min.

4) Modulus/Break Elongation

A modulus and a break elongation were measured under a condition in which the polyamide-imide film having a length of 50 mm and a width of 10 mm was pulled according to ASTM D882 at 25° C. and 50 mm/min using the UTM 3365 (Instron Corporation).

A thickness of the film was measured, and data of a value thereof was input to the device. A unit of the modulus is GPa, and a unit of the break elongation is %.

5) Light Transmittance

For the film having a thickness of 50 μm, a total light transmittance measured in the entire wavelength region of 400 to 700 nm and a single wavelength light transmittance measured at 338 nm were measured according to ASTM D1746 using a spectrophotometer (COH-400, Nippon Denshoku Industries Co., Ltd.) and a UV/Vis (UV3600, Shimadzu Corporation), respectively. A unit of the light transmittance is %.

6) Haze

A haze of the film having a thickness of 50 μm was measured according to ASTM D1003 using the spectrophotometer (COH-400, Nippon Denshoku Industries Co., Ltd.). A unit of the haze is %.

7) Yellow Index (YI) and b* Value

A yellow index and a b* value of the film having a thickness of 50 μm were measured according to ASTM E313 using a colorimeter (ColorQuest XE, Hunter Associates Laboratory, Inc.).

[Preparation Example 1] Preparation of Composition for Forming Base Layer

Terephthaloyl dichloride (TPC) and 2,2'-bis(trifluoromethyl)-benzidine (TFMB) were put into a solution in which dichloromethane and pyridine were mixed with each other and the mixture was stirred in a reactor under a nitrogen atmosphere at 25° C. for 2 hours. In this case, a molar ratio of TPC:TFMB was set to 300:400, and a content of a solid content was adjusted to 10 wt %. Thereafter, the reactant was precipitated in an excess amount of methanol and then filtered, and the obtained solid content was vacuum-dried at 50° C. for 6 hours or longer to obtain an oligomer. A formula weight (FW) of the produced oligomer was 1,670 g/mol.

N,N-dimethylacetamide (DMAc) as a solvent, 100 moles of the oligomer, and 28.6 moles of 2,2'-bis(trifluoromethyl)-benzidine (TFMB) were injected into the reactor and sufficiently stirred.

After confirming that the solid raw material was completely dissolved, fumed silica (surface area: 95 $m^2$/g, <1 μm) was added to DMAc in an amount of 1,000 ppm with respect to the solid content, and the fumed silica was dispersed using ultrasonic waves and then injected into the reactor. 64.3 moles of cyclobutanetetracarboxylic dianhydride (CBDA) and 64.3 moles of 4,4'-hexafluoroisopropylidene diphthalic anhydride (6FDA) were sequentially injected into the reactor and sufficiently stirred, and then polymerization was performed at 40° C. for 10 hours. At this time, a content of the solid content was 20 wt %. Subsequently, each of pyridine and acetic anhydride was added to the solution in an amount of 2.5 moles times a total content of dianhydride, and the mixture was stirred at 60° C. for 12 hours.

After the polymerization was finished, the polymerization solution was precipitated in an excess amount of methanol and filtered, and the obtained solid content was vacuum-dried at 50° C. for 6 hours or longer, thereby obtaining polyamide-imide powder. The powder was diluted and dissolved with DMAc at 20% to prepare a composition for forming a base layer.

[Preparation Example 2] Preparation of Composition for Forming Hard Coating Layer 2-(3,4-epoxycyclohexyl)ethyltrimethoxysilane (ECTMS, Tokyo chemical industry Co., Ltd.) and water were mixed with each other at a ratio of 24.64 g:2.70 g (0.1 mol:0.15 mol) to prepare a reaction solution, and the reaction solution was placed into a 250 mL 2-neck flask. 0.1 mL of tetramethylammonium hydroxide (Aldrich Corporation) as a catalyst and 100 mL of tetrahydrofuran (Aldrich Corporation) were added to the mixture and stirred at 25° C. for 36 hours. Thereafter, layer separation was performed, a product layer was extracted with methylene chloride (Aldrich Corporation), moisture was removed from extract with magnesium sulfate (Aldrich Corporation), and the solvent was vacuum-dried, thereby obtaining an epoxy siloxane-based resin. A weight average molecular weight of the epoxy siloxane-based resin was measured using gel permeation chromatography (GPC), and the measured weight average molecular weight was 2,500 g/mol.

A composition was prepared by mixing 30 g of the prepared epoxy siloxane-based resin, 10 g of (3',4'-epoxycyclohexyl)methyl 3,4-epoxycyclohexanecarboxylate and 5 g of bis[(3,4-epoxycyclohexyl)methyl]adipate as a crosslinking agent, 0.5 g of (4-methylphenyl)[4-(2-methylpropyl)phenyl]iodoniumhexafluorophosphate as a photoinitiator, and 54.5 g of methyl ethyl ketone with each other.

[Preparation Example 3] Preparation of Composition for Forming Hard Coating Layer A composition was prepared in the same manner as that of Preparation Example 2, except that a monomer obtained by mixing 20 g of 2-(3,4-epoxycyclohexyl)ethyltrimethoxysilane and 4.64 g of 2-(3,4-epoxycyclohexyl)ethylmethyldimethoxysilane with each other was used and a weight average molecular weight thereof was 2,600 g/mol.

[Preparation Example 4] Preparation of Composition for Forming Hard Coating Layer A composition was prepared by mixing 40 g of the epoxy siloxane-based resin prepared in Preparation Example 2, 5 g of bis[(3,4-epoxycyclohexyl)methyl]adipate, 0.5 g of (4-methylphenyl)[4-(2-methylpropyl)phenyl]iodoniumhexafluorophosphate as a photoinitiator, and 54.5 g of methyl ethyl ketone with each other.

[Preparation Example 5] Preparation of Composition for Forming Anti-Fingerprint Layer 30 g of pentaerythritol tetramethacrylate (M340, Miwon Specialty Chemical Co., Ltd.), 3 g of fluorinated acrylate (MEGAFACE RS-75, DIC Corporation), 1 g of 1-hydroxycyclohexyl-phenylketone (Omnirad 184, IGM Resins) as a photoinitiator, and g of methyl ethyl ketone were stirred for 2 hours, thereby preparing a composition for forming an anti-fingerprint layer.

Example 1

1) Production of Base Film

The composition for forming a base layer prepared in Preparation Example 1 was coated onto a PET base film, and a polyamide-imide film was continuously produced in a drying region divided into four regions and a tenter stretching region divided into five regions.

First, the composition for forming a base layer was continuously coated onto the PET base film at room temperature using a slot die and the coated composition was dried in a drying region designed with four drying regions. The drying in a first drying region was performed at 85° C. for 2 minutes, the drying in a second drying region was performed at 115° C. for 2 minutes, the drying in a third drying region was performed at 130° C. for 2 minutes, and the drying in a fourth drying region was performed at 140° C. for 2 minutes. A content of a solvent in the film passed through the drying region was 22 wt %.

Subsequently, the dried film was separated from the PET base film, and the base film was stretched using a pin tenter. A stretching region was divided into five regions. In a first stretching region, the base film was subjected to no stretching at 150° C. In a second stretching region, a temperature was set to 170° C., and the base film was stretched to 102% (it means that the base film was stretched 1.02 times a width of the film in the first stretching region) in a machine direction (MD). In a third stretching region, a temperature was set to 210° C., and the stretch width of 102% of the base film was maintained. In a fourth stretching region, a temperature was set to 240° C., the base film was shrunk to have a stretch width of 101%. In a fifth stretching region, a temperature was set to 240° C., and the base film was shrunk in two stages to have a stretch width of 100.5%. The content of the solvent in the film passed through the stretching region was adjusted to 1.8 wt %. The stretch width was calculated based on a stretch width of the film introduced into the first stretching region.

The produced polyamide-imide film had a thickness of 50 μm, a transmittance at 388 nm of 15%, a total light transmittance of 89.73%, a haze of 0.4%, a yellow index (YI) of 1.9, a b* value of 1.0, a modulus of 6.5 GPa, a break elongation of 21.2%, a weight average molecular weight of 310,000 g/mol, a polydispersity index (PDI) of 2.11, and a pencil hardness of HB.

2) Formation of Hard Coating Layer

Next, the composition for forming a hard coating layer prepared in Preparation Example 2 was applied onto one surface of the produced polyamide-imide film having the thickness of 50 μm using a meyer bar, and the composition was dried at 60° C. for 5 minutes, irradiated with UV at 1 J/cm$^2$ using a high-pressure metal lamp, and cured at 120° C. for 15 minutes, thereby producing a window cover film on which a hard coating layer having a thickness of 10 μm was formed.

The physical properties of the produced window cover film were measured. The results are shown in Table 1.

Example 2

A window cover film was produced in the same manner as that of Example 1, except that the composition for forming a hard coating layer prepared in Preparation Example 3 was used in Example 1 instead of the composition for forming a hard coating layer prepared in Preparation Example 2.

The physical properties of the produced window cover film were measured. The results are shown in Table 1.

Example 3

The composition for forming a base layer obtained in Preparation Example 1 was subjected to solution casting on a glass substrate using a bar coating method. Thereafter, the film was subjected to a heat treatment in a vacuum oven at 230° C. for 30 minutes and cooled at room temperature and the film formed on the glass substrate was separated from the substrate to obtain a polyamide-imide film having a thickness of 50 μm.

The composition for forming a hard coating layer was applied onto the thus-produced polyamide-imide film in the same manner as that of Example 1 to produce a window cover film.

The physical properties of the produced window cover film were measured. The results are shown in Table 1.

Example 4

The composition for forming a base layer obtained in Preparation Example 1 was subjected to solution casting on a glass substrate using a bar coating method. Thereafter, the film was subjected to a heat treatment in a vacuum oven at 230° C. for 30 minutes and cooled at room temperature and the film formed on the glass substrate was separated from the substrate to obtain a polyamide-imide film having a thickness of 50 μm.

The composition for forming a hard coating layer was applied onto the thus-produced polyamide-imide film in the same manner as that of Example 3 to form a hard coating layer. The composition for forming an anti-fingerprint prepared in Preparation Example 5 was applied onto an upper surface of the hard coating layer using a meyer bar, and the composition was dried at 70° C. for 2 minutes and cured by irradiation with UV at J/cm$^2$ using a high-pressure metal lamp, thereby producing a window cover film on which an anti-fingerprint layer having a thickness of 1 μm was formed.

The physical properties of the produced window cover film were measured. The results are shown in Table 1.

Comparative Example 1

A polyamide-imide film was produced in the same manner as that of Example 1 except that the hard coating layer was not formed.

The physical properties of the produced film were measured. The results are shown in Table 1.

Comparative Example 2

The composition for forming a base layer obtained in Preparation Example 1 was subjected to solution casting on a glass substrate using a bar coating method. Thereafter, the film was subjected to a heat treatment in a vacuum oven at 230° C. for 30 minutes and cooled at room temperature and the film formed on the glass substrate was separated from the substrate to obtain a polyamide-imide film having a thickness of 50 μm.

The composition for forming a hard coating layer prepared in Preparation Example 4 was applied onto the thus-produced polyamide-imide film using a meyer bar, and the composition was dried at 60° C. for 5 minutes, irradiated with UV at 1 J/cm$^2$ using a high-pressure metal lamp, and cured at 120° C. for 15 minutes, thereby producing a window cover film on which a hard coating layer having a thickness of 10 μm was formed.

The physical properties of the produced window cover film were measured. The results are shown in Table 1.

TABLE 1

|  | Pencil hardness | Folding | Crack | | | | |
|---|---|---|---|---|---|---|---|
|  |  |  | 30,000 times | 100,000 times | 150,000 times | 180,000 times | 200,000 times |
| Example 1 | 4 H | In/Out | X | X | X | ○ | ○ |
|  |  | In | X | X | X | X | X |
|  |  | Out | X | X | X | ○ | ○ |
| Example 2 | 5 H | In/Out | X | X | X | X | X |
|  |  | In | X | X | X | X | X |
|  |  | Out | X | X | X | X | X |
| Example 3 | 4 H | In/Out | X | X | ○ | ○ | ○ |
|  |  | In | X | X | X | X | X |
|  |  | Out | X | X | ○ | ○ | ○ |
| Example 4 | 4 H | In/Out | X | X | ○ | ○ | ○ |
|  |  | In | X | X | X | X | X |
|  |  | Out | X | X | ○ | ○ | ○ |
| Example 1 | HB | In/Out | ○ | ○ | ○ | ○ | ○ |
|  |  | In | ○ | ○ | ○ | ○ | ○ |
|  |  | Out | ○ | ○ | ○ | ○ | ○ |
| Example 2 | 6 H | In/Out | ○ | ○ | ○ | ○ | ○ |
|  |  | In | X | X | ○ | ○ | ○ |
|  |  | Out | ○ | ○ | ○ | ○ | ○ |

From Table 1, it could be appreciated that, as could be seen from Examples 1 and 2, in the case where the mixtures of Formula 1 and Formula 2 were used, the bending properties were significant, and in particular, cracks did not occur even in a bending property evaluation in which the bending operation was repeated 200,000 or more times. In addition, it was confirmed that, as could be seen from Examples 1 and 3, in the case where the base film was used in a particularly limited condition in the drying and stretching conditions of the present invention, a window cover film having significantly improved bending properties was provided.

In addition, it was confirmed that as could be seen from Example 1 and Comparative Example 1, when the hard coating layer was formed, the bending properties were significantly improved.

As set forth above, the present invention may provide the window cover film applicable to the flexible display device capable of both in-folding and out-folding at a specific position.

Since the window cover film of the present invention has high surface hardness, flexibility, the excellent bending properties, the window cover film may be restored to the original form without permanent deformation and/or damage of the hard coating layer and the window cover film even though a predetermined deformation is repeated.

Further, the window cover film of the present invention has no fine cracks even after being repeatedly bent. Therefore, the durability and lifetime characteristics of the flexible display device may thus be secured.

Further, the window cover film according to an exemplary embodiment of the present invention may have further improved flexibility and mechanical strength by adjusting the thickness of each of the base layer and the hard coating layer at a predetermined ratio.

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all modifications equal or equivalent to the claims are intended to fall within the scope and spirit of the present invention.

What is claimed is:

1. A window cover film comprising:
   a polyamide-imide film prepared from a polyamide-imide base layer prepared from polymerization of an amine-terminated polyamide oligomer derived from a first fluorine-based aromatic diamine and an aromatic diacid dichloride with a second fluorine-based aromatic diamine, an aromatic dianhydride, and an alicyclic dianhydride, wherein the first fluorine-based aromatic diamine and the second fluorine-based aromatic diamine may be chemically the same or different, wherein the polyamide-imide film is prepared by applying the base layer onto a base material, drying the base layer in a plurality of drying regions to form a dried base layer, and stretching the dried base layer in a plurality of stretching regions; and
   a hard coating layer formed on at least one surface of the base layer,
   wherein a hybrid folding resistance capacity is 150,000 or more, the hybrid folding resistance capacity referring to the number n of times of repeated measurement on one surface in which a crack initially occurs when in-folding at a specific position of the window cover film against a cylinder having a radius of 5 mm at a rate of 60 cycles/min is repeatedly performed n times, and out-folding at the same position of the window cover film subjected to the in-folding, under the same conditions as those in the in-folding is repeatedly performed n times.

2. The window cover film of claim 1, wherein the hybrid folding resistance capacity is 180,000 or more.

3. The window cover film of claim 2, wherein the hybrid folding resistance capacity is 200,000 or more.

4. The window cover film of claim 1, wherein the base layer has a modulus measured according to ASTM D882 of 3 GPa or more and a break elongation measured according to ASTM D882 of 8% or more.

5. The window cover film of claim 1, wherein the base layer has a light transmittance measured at 388 nm according to ASTM D1746 of 5% or more, a total light transmittance measured at 400 to 700 nm according to ASTM D1746 of 87% or more, a haze of 2.0% or less, a yellow index of 5.0 or less, and a b* value of 2.0 or less.

6. The window cover film of claim 1, wherein a thickness of the base layer is 10 to 500 μm, and a thickness of the hard coating layer is 1 to 50 μm.

7. The window cover film of claim 1, wherein the hard coating layer includes an alicyclic epoxidized silsesquioxane-based compound.

8. The window cover film of claim 1, wherein a pencil hardness of the hard coating layer is 2 H or higher.

9. The window cover film of claim 1, further comprising an anti-fingerprint layer formed on the hard coating layer.

10. A flexible display panel comprising the window cover film of claim 1.

11. The window cover film of claim 1, wherein the first fluorine-based aromatic diamine is 2,2'-bis(trifluoromethyl)-benzidine.

12. The window cover film of claim 1, wherein the aromatic diacid dichloride is selected from one or a mixture of two or more of isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and/or derivatives thereof.

13. The window cover film of claim 1, wherein the second fluorine-based aromatic diamine is 2,2'-bis(trifluoromethyl)-benzidine.

14. The window cover film of claim 1, wherein the aromatic dianhydride is selected from one or a mixture of two or more of 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride (SO2DPA), (isopropylidenediphenoxy) bis(phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (B TDA), bis(carboxyphenyl) dimethyl silane dianhydride (SiDA), and/or bis(dicarboxyphenoxy) diphenyl sulfide dianhydride (BDSDA).

15. The window cover film of claim 1, wherein the alicyclic dianhydride is selected from one or a mixture of two or more of 1,2,3,4-cyclobutanetetracarboxylic dianhydride (CB DA), 5-(2,5-dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and/or derivatives thereof.

* * * * *

UNITED STATES PATENT AND TRADEMARK OFFICE
CERTIFICATE OF CORRECTION

PATENT NO. : 11,970,592 B2
APPLICATION NO. : 17/034384
DATED : April 30, 2024
INVENTOR(S) : Jong Nam Ahn et al.

Page 1 of 1

It is certified that error appears in the above-identified patent and that said Letters Patent is hereby corrected as shown below:

In the Claims

Column 26, Line 12, Claim 14, delete "(B TDA)," and insert -- (BTDA), --

Column 26, Line 18, Claim 15, delete "(CB DA)," and insert -- (CBDA), --

Signed and Sealed this
Twenty-fifth Day of June, 2024

Katherine Kelly Vidal
*Director of the United States Patent and Trademark Office*